(12) United States Patent
Miller et al.

(10) Patent No.: US 7,255,193 B2
(45) Date of Patent: Aug. 14, 2007

(54) SPEED EQUALIZING LINKAGE DESIGN FOR DUAL HYDROSTATIC TRANSMISSIONS

(75) Inventors: Russell G. Miller, Terril, IA (US); James M. Casey, Spencer, IA (US)

(73) Assignee: Eaton Corporation, Cleveland, OH (US)

( * ) Notice: Subject to any disclaimer, the term of this patent is extended or adjusted under 35 U.S.C. 154(b) by 328 days.

(21) Appl. No.: 11/093,467

(22) Filed: Mar. 30, 2005

(65) Prior Publication Data
US 2006/0230848 A1   Oct. 19, 2006

(51) Int. Cl.
*A01D 34/68* (2006.01)

(52) U.S. Cl. ............... 180/305; 180/215; 180/242; 180/308; 180/165; 180/247

(58) Field of Classification Search ........ 180/305, 180/215, 242, 308, 165, 247
See application file for complete search history.

(56) References Cited

U.S. PATENT DOCUMENTS

| | | | | |
|---|---|---|---|---|
| 3,316,773 A | * | 5/1967 | Findlay | 74/481 |
| 5,077,959 A | * | 1/1992 | Wenzel | 56/11.1 |
| 5,538,264 A | * | 7/1996 | Brown et al. | 280/5.514 |
| 5,822,961 A | * | 10/1998 | Busboom | 56/11.4 |
| 6,155,033 A | * | 12/2000 | Wians et al. | 56/11.1 |
| 6,341,479 B1 | * | 1/2002 | Scag et al. | 56/11.3 |
| 6,904,985 B2 | * | 6/2005 | Ferree et al. | 180/6.32 |
| 7,073,620 B2 | * | 7/2006 | Braun et al. | 180/410 |

* cited by examiner

*Primary Examiner*—Christopher P. Ellis
*Assistant Examiner*—Cynthia F. Collado
(74) *Attorney, Agent, or Firm*—Sonu N. Weaver; K. J. Kasper

(57) ABSTRACT

An HST propel system includes first and second pumps having displacements variable in response to movement of first (31) and second (33) control shafts, respectively; and a linkage arrangement for moving the control shafts in unison in response to movement of an operator input (37). The linkage arrangement comprises a crank arm (35) rotatable about its axis in response to movement of the input device, first (41) and second (51) input arms fixed relative to the crank arm, and first (45) and second (55) elongated control rods pivotally connected to the input arms. The system includes a swivel connector (43) cooperating with its input arm to define a swivel axis (S.A.$_1$), fixed relative to the axis of the crank arm, and a swivel connector (53) cooperating with its input arm to define a swivel axis (S.A.$_2$), moveable relative to the axis of the crank arm for straight tracking adjustment.

4 Claims, 5 Drawing Sheets

SPEED EQUALIZING LINKAGE DESIGN FOR DUAL HYDROSTATIC TRANSMISSIONS

BACKGROUND OF THE DISCLOSURE

The present invention relates to hydrostatic drive systems, and more particularly, to such drive systems of the "dual path" type, having a pair of drive wheels (or tracks, etc.), each of which is driven by a separate, separately-adjustable hydrostatic transmission (HST).

A number of different types of vehicles use some form of dual path HST propel arrangement, and it is not intended that the present invention be limited to any particular type or configuration of vehicle. Therefore, and as an example, although the present invention will be illustrated and described in connection with a pair of drive wheels, it should be understood that the invention could be utilized also on a tracked vehicle, and references hereinafter to "driven wheels" will be understood to mean and include any of the known, possible types of outputs.

An example of a vehicle of the type which could utilize the present invention is a lawn care or turf care vehicle (a mower) especially one of the "wheel-steered" type, i.e., a vehicle in which steering is accomplished by driving one of the driven wheels at a different speed than the other driven wheel. By way of further example, the present invention may be utilized on vehicles of the "ZTR" type (zero-turn-radius) in which either driven wheel may be driven in either the forward or reverse direction, independently of the other driven wheel.

In the conventional dual HST propel system, the left and right driven wheels are driven by left and right hydrostatic transmissions, each HST including a motor having its output shaft adapted to drive its respective driven wheel. Typically, the motor is fixed displacement, but the pump hydraulically coupled to the motor is of the variable displacement type. It should be understood that the pump and motor of the HST may be of the axial piston type, or of the radial piston type, or of any other type wherein the pump displacement may be varied by variations in a manual input to the pump, such as a rotatable control shaft. By use of the term "manual" input, it should be understood that the invention could be utilized in a system having pumps with direct, mechanical operator input, or in one having pumps where the displacement is controlled by some sort of hydraulic servo system of the type now well known in the art.

The present invention relates especially to such dual HST propelled vehicles of the type in which the input from the operator, to select the vehicle speed, is transmitted to a speed control crank arm, to rotate the arm about its axis in an amount corresponding to the desired speed of the vehicle. Attached to the speed control crank arm are identical linkage arrangements, one to control the displacement of the pump on the left HST and the other to control the displacement of the pump on the right HST. As is well known to those skilled in the art, the two linkage arrangements are designed and intended to be identical so that, as the operator selects a desired vehicle speed, and rotates the speed control crank arm, the same input motion will be transmitted to the displacement control mechanism of both of the left and right pumps, for the purpose of transmitting the same drive speed to each of the driven wheels.

However, as is also known all too well by those skilled in the art, it is one thing to design the two propel paths (and the control linkages) to be identical, but it is another matter entirely to actually produce and install a pair of HST propel systems on a vehicle, and have them provide exactly the same speed of rotation of the driven wheels for any given operator input to the speed control crank arm. For example, there may be slight, unintended, differences between the linkage arrangements for the left and right HST (or slight differences in the displacements of the left and right HST pumps or motors). Finally, in some cases, there may be a slight difference in tire size which can result in a noticeable deviation from the intended "straight-tracking".

BRIEF SUMMARY OF THE INVENTION

Accordingly, it is an object of the present invention to provide a hydrostatic drive system for first and second driven wheels which is able to be set to accomplish straight tracking of the dual HST's, in spite of any inherent variations between the two propel paths.

It is a related object of the present invention to provide such an improved hydrostatic drive system which accomplishes the above-stated object without effecting the neutral setting of the pump of either of the HST's.

It is a further object of the present invention to provide such an improved hydrostatic drive system which accomplishes the above objects without the addition of any substantial structure or manufacturing cost.

The above and other objects of the invention are accomplished by the provision of an improved hydrostatic drive system to drive first and second driven wheels of a vehicle, including first and second hydraulic motors operable to transmit output torque to the first and second driven wheels, respectively, and first and second hydraulic pumps, hydraulically coupled to the first and second motors, respectively. The first and second hydraulic pumps have displacements variable in response to movement of first and second control shafts, respectively. A linkage arrangement is provided for moving the first and second control shafts in unison in response to movement of an operator input device. The linkage arrangement comprises a crank arm rotatable about its axis in response to movement of the operator input device and first and second input arms fixed relative to the crank arm to pivot about the axis as the crank arm rotates. First and second elongated control rods are pivotally connected to the first and second input arms, respectively, with first and second swivel connectors, respectively, to move the first and second control rods longitudinally in response to rotation of the crank arm. First and second linkages are operable to transmit the longitudinal movement of the first and second control rods, respectively, into movement of the first and second control shafts, respectively.

The improved hydrostatic drive system is characterized by the first swivel connector cooperating with the first input arm to define a first swivel axis fixed relative to the axis of the crank arm. The second swivel connector cooperates with the second input arm to define a second swivel axis moveable relative to the axis of the crank arm to permit straight tracking adjustment thereof.

In accordance with a more specific aspect of the invention, the first and second input arms are oriented substantially perpendicular to the first and second control rods, respectively, when the first and second hydraulic pumps are at substantially zero displacement, and the second input arm defines an elongated opening oriented radially relative to the axis of the crank arm, the second swivel connector extending through the elongated opening to define the second swivel axis moveable relative to the axis of the crank arm.

DETAILED DESCRIPTION OF THE PREFERRED EMBODIMENT

Figure 1:
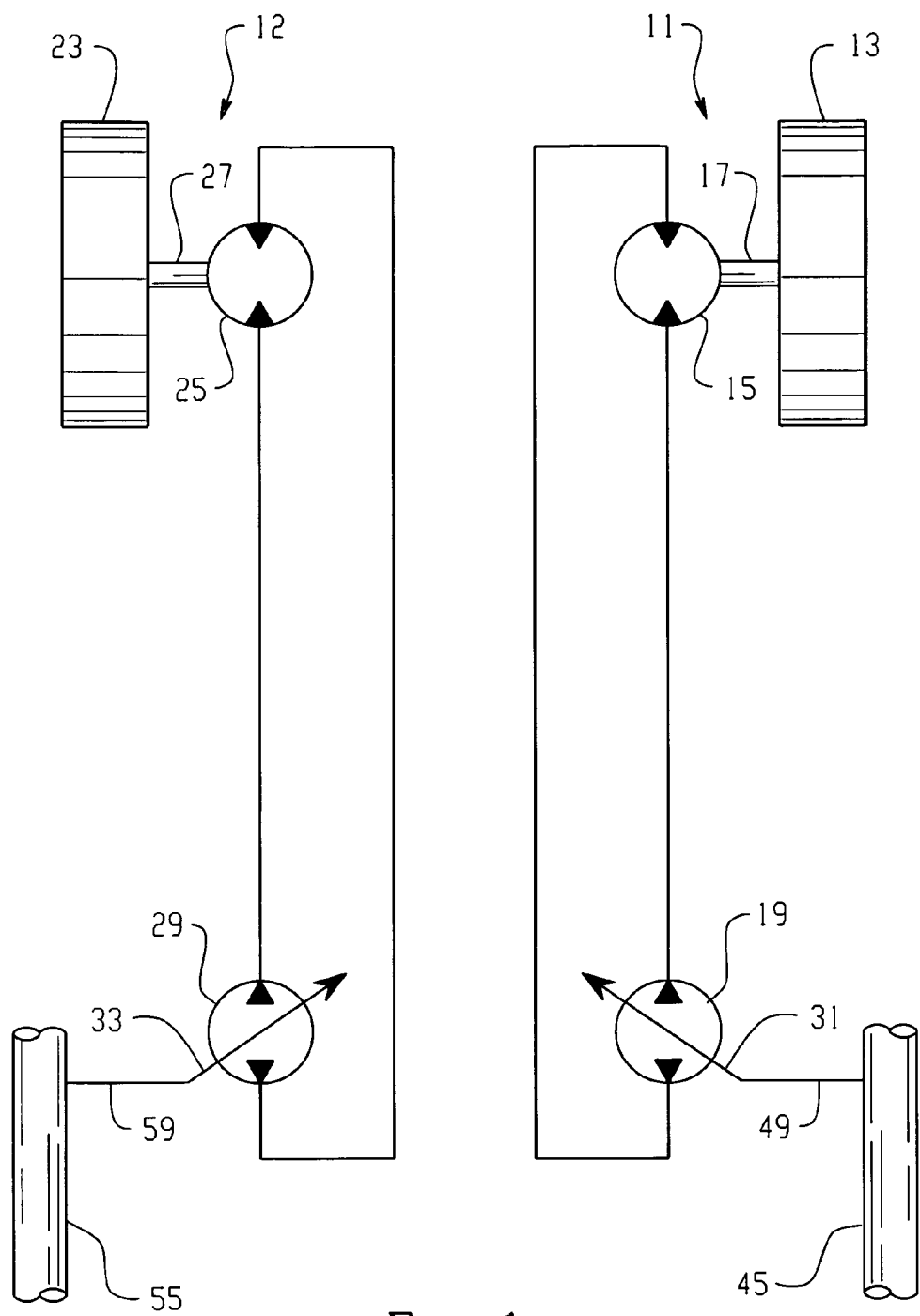
FIG. 1 is a simplified hydraulic schematic of a dual path HST propel system of the type with which the present invention may be utilized.

Referring now to the drawings, which are not intended to limit the invention, FIG. 1 illustrates, schematically, a dual hydrostatic transmission propel system of the type to which the present invention relates. The propel system includes a first propel path, generally designated 11 and a second propel path, generally designated 12. The first propel path 11 includes a driven wheel 13, a hydraulic motor 15 having an output shaft 17 and a hydraulic pump 19, the pump 19 being of the variable displacement type. Similarly, the second propel path 12 includes a driven wheel 23, a hydraulic motor 25 having an output shaft 27, and a hydraulic pump 29. The hydraulic pump 29 is also of the variable displacement type.

The displacements of the hydraulic pumps 19 and 29 may be controlled by rotation of first and second control shafts, respectively, represented schematically herein by the reference numerals 31 and 33, respectively. As is well known to those skilled in the art, "control shafts" comprise the conventional inputs for radial ball and radial piston pumps, whereas the schematic symbols 31 and 33 utilized in FIG. 1 are normally used to represent variable swashplates of axial piston pumps. Either way, it will be understood that the elements bearing the reference numerals 31 and 33 mean and include whatever must be moved to vary the displacements of the pumps 19 and 29.

Figure 2:
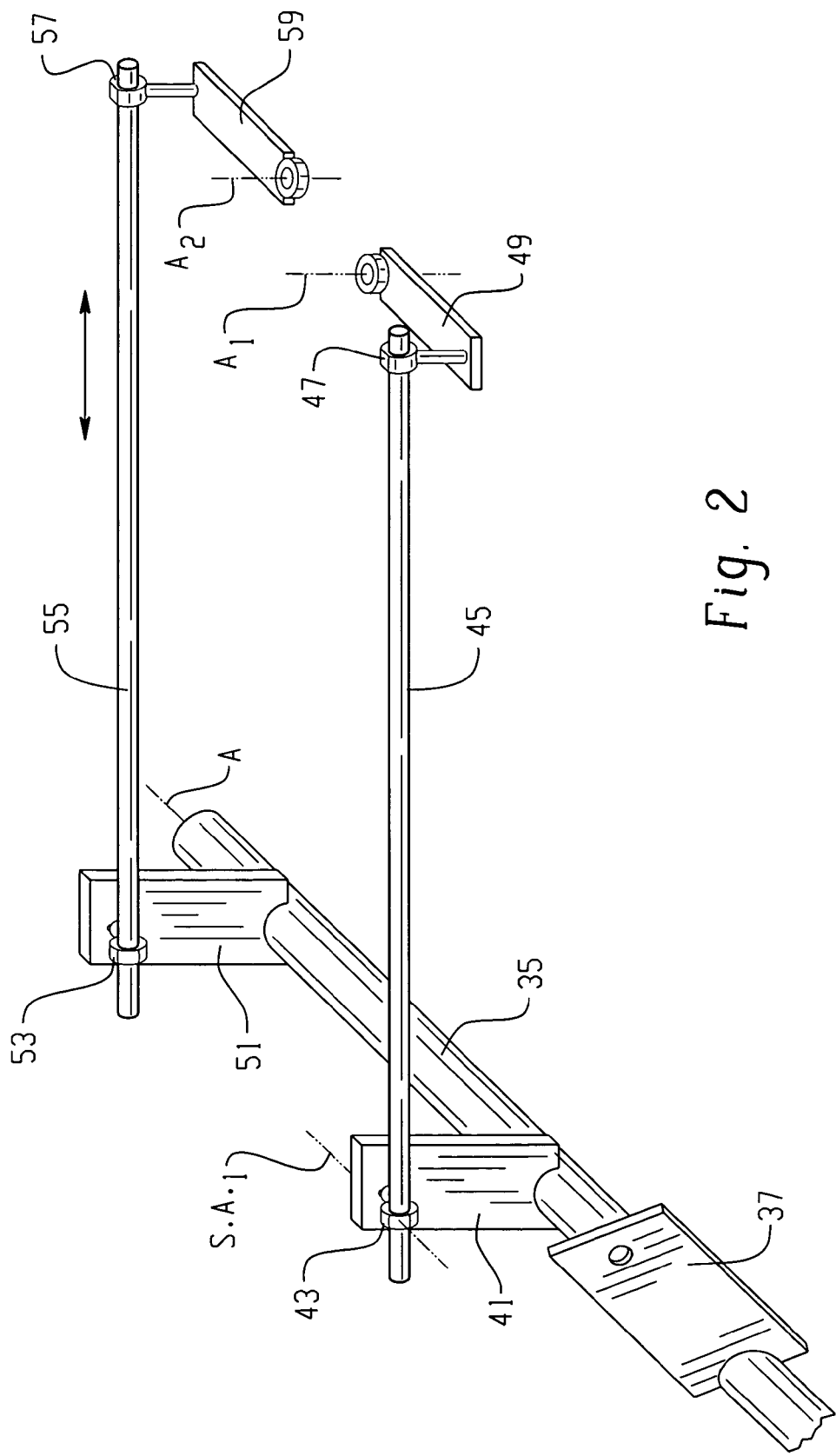
FIG. 2 is a somewhat simplified, perspective view of a linkage arrangement of the type to which the present invention relates.

Referring now primarily to FIG. 2, there is illustrated a linkage arrangement by means of which the vehicle operator can move the first and second control shafts 31 and 33 to achieve a desired drive speed of the driven wheels 13 and 23. The linkage arrangement of FIG. 2 includes a crank arm 35 which is mounted to be fixed relative to the vehicle frame (not shown herein). The crank arm 35 is rotatable about its axis of rotation A in response to movement of an operator input device (not shown herein) which is connected to an arm 37 extending radially from the crank arm 35. Thus, references hereinafter to an "operator input device" will bear the reference numeral "37".

Rotation of the crank arm 35 about its axis of rotation A is intended to transmit identical input motions to each of the control shafts 31 and 33 by means of a pair of linkage arrangements which are intended to be identical. Therefore, and as shown in FIG. 2, there is a first linkage arrangement including a first input arm 41 which is connected by means of a swivel connector 43 to a first control rod 45. The first control rod 45 is connected by means of a swivel connector 47 to a crank arm 49 which defines a vertical axis $A_1$ such that, when the crank arm 49 rotates about its axis $A_1$, the first control shaft 31 is rotated correspondingly to vary the displacement of the pump 19. Similarly, there is a second linkage arrangement including a second input arm 51 which is connected by means of a swivel connector 53 to a second control rod 55. The second control rod 55 is connected, by means of a swivel connector 57 to a second crank arm 59, which defines a vertical axis $A_2$. Rotation of the second crank arm 59 about the axis $A_2$ results in rotation of the second control shaft 33 to vary the displacement of the pump 29.

Figure 5:
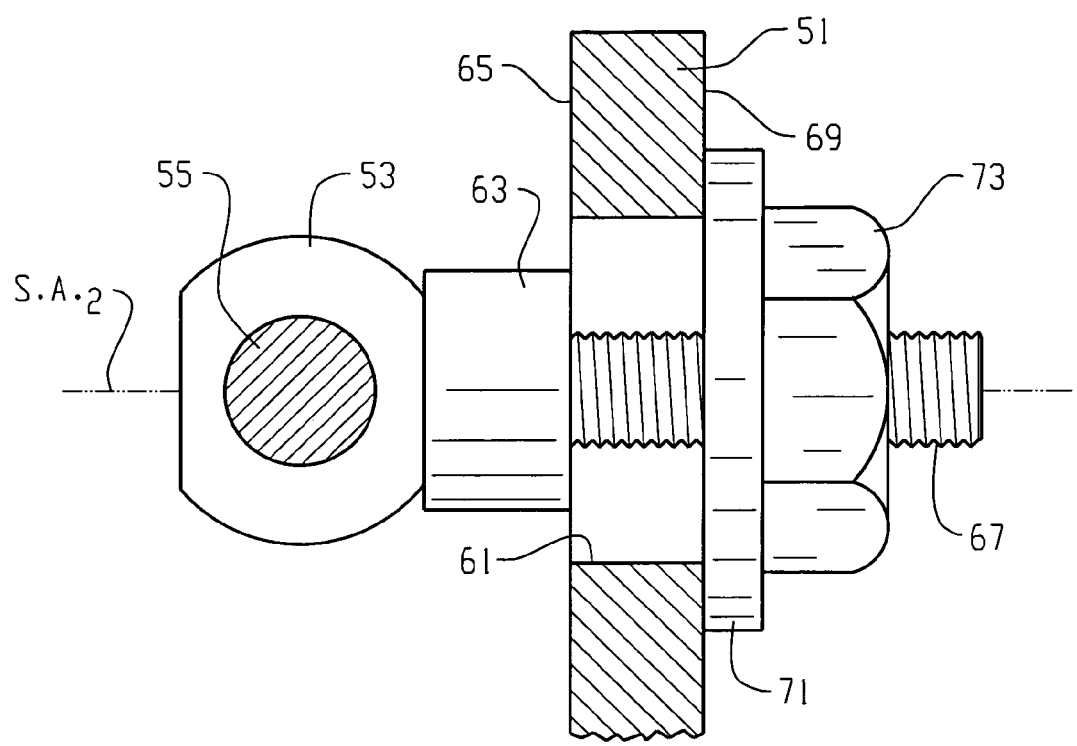
FIG. 5 is a transverse cross-section, taken on line 5-5 of FIG. 4, but with the swivel connector assembly present in FIG. 5, rather than being omitted, as in FIG. 4.

Referring still to FIG. 2, as would be typical in the known, prior art linkage arrangements, the swivel connector 43 includes a threaded stud-like portion (similar to what is shown in FIG. 5) extending through the first input arm 41, and more specifically, through an opening in the input arm 41 which is just slightly oversized relative to the stud-like portion. As a result, the swivel connector 43 cooperates with the first input arm 41 to define a first swivel axis $S.A._1$ which is fixed relative to the axis of rotation A of the crank arm 35. Therefore, as the crank arm 35 arm rotates, the distance between its axis of rotation A and the swivel axis $S.A._1$ of the first linkage arrangement will remain constant.

Figure 3:
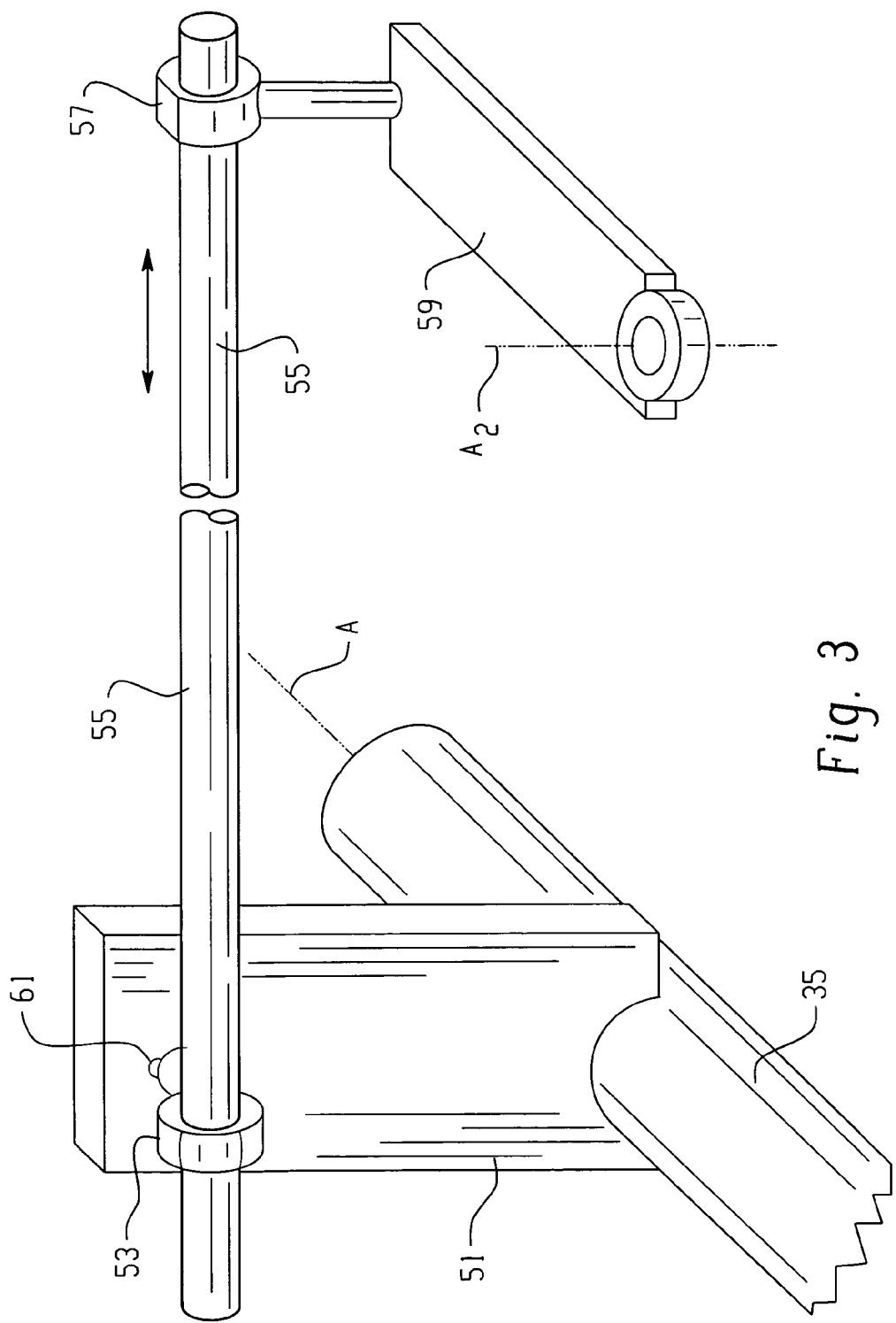
FIG. 3 is an enlarged, fragmentary, and partly broken-away, view of the linkage arrangement for controlling the second HST.
Figure 4:
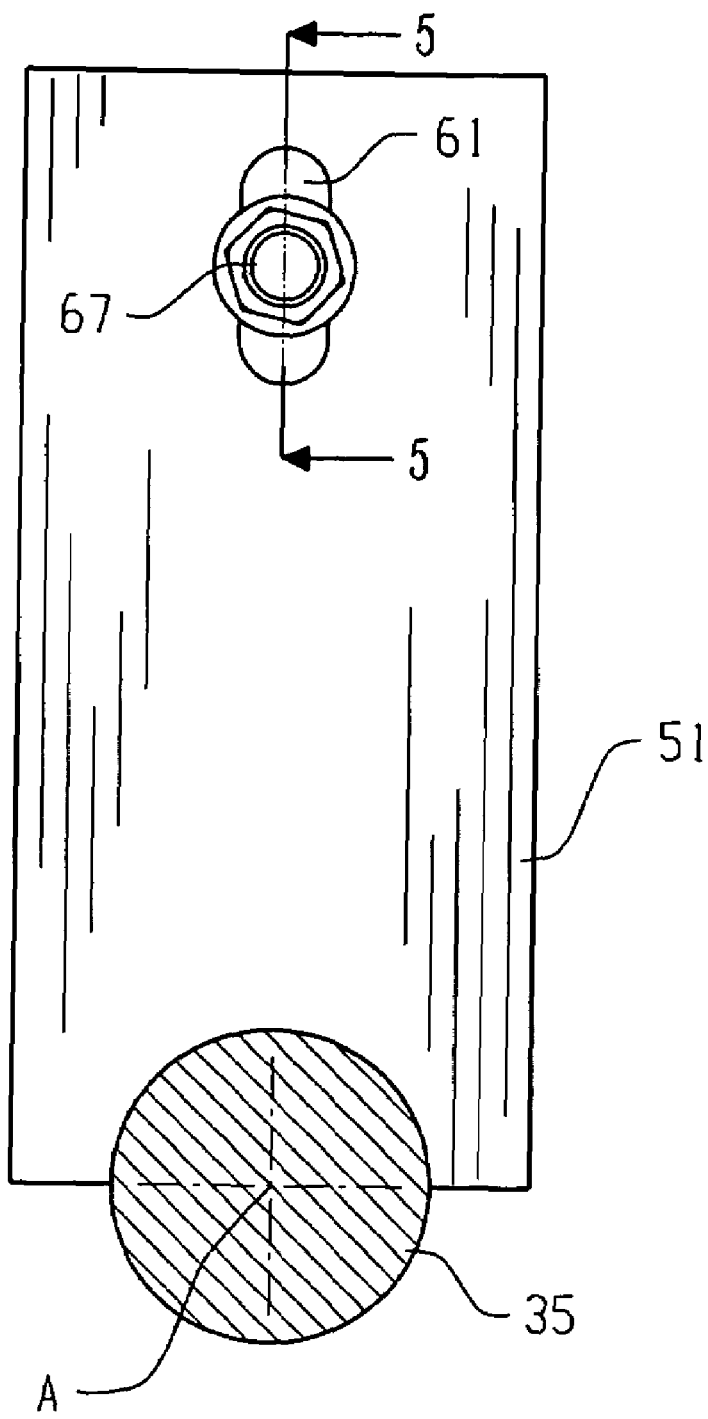
FIG. 4 is a greatly enlarged, but somewhat schematic view of the second control arm, illustrating one important aspect of the present invention.

Referring now primarily to FIGS. 3 through 5, one important aspect of the present invention will now be described. The second input arm 51 defines an elongated opening 61 which, as may best be seen in FIG. 4 is preferably arranged and configured to be perpendicular to the second control rod 55 when the linkage arrangement is in the neutral position illustrated in FIG. 2, corresponding to the neutral (zero displacement) condition of the hydraulic pump 29. As may best been seen in FIG. 5, the swivel connector 53 includes a spacer portion 63 which is disposed against an adjacent surface 65 of the second input arm 51.

The swivel connector 53 includes a threaded, stud-like portion 67 (also represented in FIG. 4) which extends through the elongated opening 61. As was mentioned previously, the swivel connector 43 would have a threaded, stud-like portion similar to the portion 67, and if a section similar to FIG. 5 were taken showing the swivel connector 43, the only difference from FIG. 5 would be that, instead of the elongated opening 61, the opening in the first input arm 41 would be closely spaced about the stud-like portion.

Referring again primarily to FIG. 5, disposed against an opposite surface 69 of the second input arm 51 is a washer 71 (preferably, a lock washer) and a nut 73, in threaded engagement with the stud-like portion 67. With the nut 73 tightened against the surface 69 of the second input arm 51, the swivel connector 53 has its location temporarily "fixed", relative to the axis of rotation A of the crank arm 35, to define a swivel axis $S.A._2$.

In accordance with another aspect of the invention, upon initial assembly of the entire linkage arrangement as shown in FIG. 2, the swivel connector 53 would typically be located in somewhat of a "centered" position, as shown in FIGS. 4 and 5, and then the nut 73 tightened to maintain the position of the swivel connector 53. It may be acceptable to simply finger tighten the nut 73 initially. Subsequently, at some stage of assembly and testing of the entire propel system, or possibly, of the entire assembled vehicle, the propel system would be subjected to a "straight tracking" test.

In performing the straight tracking test, a vehicle equipped with the HST propel system would be placed on a test set-up including a pair of rotatable drums, each being engaged by one of the drive wheels. In such a set-up, the speed of rotation of the drums is sensed, thus indicating the linear speed of the driven wheels 13 and 23, at the road surface. The operator input device (arm 37) would be moved to select an operating mode of the propel system, preferably, full or nearly full speed in the forward direction. Thus, the crank arm 35 would be rotated, thus pivoting the input arms 41 and 51 about the axis of rotation A, and moving the control rods 45 and 55 linearly along their axes. Theoretically, the measured output speeds of the two propel paths 11 and 12 should be identical, but as was noted in the BACKGROUND OF THE DISCLOSURE, this is typically not the case for reasons already explained. If, by way of example, the straight tracking test would show that the output speed of the output shaft 27 is slightly less than that of the output shaft 17, indicating a need for an increase in rotation of the second control shaft 33, the following adjustment would be made. The nut 73 would be loosened just enough to permit the swivel connector 53 to be moved slightly upward relative to the elongated opening 61 until it is observed that the rotational speeds of the output shafts 17 and 27 become identical. When that desired result is achieved, the nut 73 would be tightened with the swivel connector 53 in the position which yields the desired straight tracking condition (i.e., the speed of rotation of output shaft 17 equal to that of output shaft 27).

Although the present invention has been illustrated and described in connection with a particular embodiment, it should be clearly understood that many variations may be made in the hardware shown, but still within the scope of the present invention. For example, instead of the swivel connectors 43, 47, 53 and 57 shown in FIGS. 2, 3 and 5, the invention could utilize a somewhat different mechanism. All that is essential is that there be some sort of connection between the control rods 45 and 55 and the various arms which permits the control rods to move linearly as the arms 41 and 51 rotate about the axis A of the crank arm 35.

Although the present invention has been illustrated and described in connection with an embodiment in which, for simplicity, the control rods 45 and 55 are operated in unison, it should be apparent that the invention is not so limited. Within the scope of the invention, the control rods 45 and 55 could be independently operable (such as in a "steer-by-drive" type system), but wherein the control rods would be in the same position, relative to each other, when it is desired to achieve straight-tracking. Furthermore, it should be understood that the linkage arrangement, such as is shown in FIG. 2, is greatly simplified for ease of illustration. The linkage arrangement shown would typically have a number of additional elements. For example, a walk-behind mower utilizing the propel system of the invention would typically have spring loaded connections associated with the swivel connectors 47 and 57, so that the operator would be able to stroke both sides with one input, and then would be able to destroke each side independently, in order to steer.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A hydrostatic drive system to drive first and second driven wheels of a vehicle, including first and second hydraulic motors operable to transmit output torque to said first and second driven wheels, respectively, and first and second hydraulic pumps, hydraulically coupled to said first and second motors, respectively; said first and second hydraulic pumps having displacements variable in response to movement of first and second control shafts, respectively; and a linkage arrangement for moving said first and second control shafts in unison in response to movement of an operator input device; said linkage arrangement comprising a crank arm rotatable about its axis in response to movement of said operator input device, first and second input arms fixed relative to said crank arm to pivot about said axis as said crank arm rotates; first and second elongated control rods pivotally connected to said first and second input arms, respectively, first and second swivel connectors, respectively, to move said first and second control rods longitudinally in response to rotation of said crank arm; and first and second linkages operable to transmit said longitudinal movement of said first and second control rods, respectively, into movement of said first and second control shafts, respectively, characterized by:
   (a) said first swivel connector cooperating with said first input arm to define a first swivel axis fixed relative to said axis of said crank arm;
   (b) said second swivel connector cooperating with said second input arm to define a second swivel axis moveable relative to said axis of said crank arm to permit straight tracking adjustment thereof.

2. A hydrostatic drive system as claimed in claim 1, characterized by said first and second input arms being oriented substantially perpendicular to said first and second control rods, respectively, when said first and second hydraulic pumps, respectively, are at substantially zero displacement.

3. A hydrostatic drive system as claimed in claim 2, characterized by said first input arm defining an opening and said first swivel connector extending through said opening, to define said first swivel axis, fixed relative to said axis of said crank arm.

4. A hydrostatic drive system as claimed in claim 2, characterized by said second input arm defining an elongated opening oriented radially relative to said axis of said crank arm, said second swivel connector extending through said elongated opening to define said second swivel axis, moveable relative to said axis of said crank arm.

* * * * *